(12) United States Patent
Ayres, III et al.

(10) Patent No.: US 7,734,040 B1
(45) Date of Patent: Jun. 8, 2010

(54) MODULAR HOUSING SYSTEM FOR OUTSIDE PLANT TELECOMMUNICATIONS EQUIPMENT

(75) Inventors: John Wise Ayres, III, Cumming, GA (US); Grant Joseph Kruse, Owens Cross Roads, AL (US)

(73) Assignee: Adtran, Inc., Huntsville, AL (US)

( * ) Notice: Subject to any disclaimer, the term of this patent is extended or adjusted under 35 U.S.C. 154(b) by 268 days.

(21) Appl. No.: 12/054,687

(22) Filed: Mar. 25, 2008

(51) Int. Cl.
*H04M 1/00* (2006.01)
*H04M 9/00* (2006.01)

(52) U.S. Cl. ...................... 379/451; 379/441

(58) Field of Classification Search .............. 379/441, 379/442, 451, 454; 312/223.1, 223.4; 361/724, 361/728–730
See application file for complete search history.

(56) References Cited

U.S. PATENT DOCUMENTS

| | | | |
|---|---|---|---|
| 5,117,067 A | 5/1992 | Jaycox | 174/38 |
| 5,323,454 A | 6/1994 | Shay et al. | 379/327 |
| 5,734,776 A | 3/1998 | Puetz | 385/134 |
| 5,781,410 A | 7/1998 | Keown et al. | 361/690 |
| 5,886,296 A | 3/1999 | Ghorgani et al. | 174/50 |
| 6,535,603 B2 | 3/2003 | Laetsch | 379/338 |
| 6,654,255 B2 * | 11/2003 | Kruse et al. | 361/799 |
| 6,760,531 B1 | 7/2004 | Solheid et al. | 385/135 |
| 6,798,878 B2 | 9/2004 | Laetsch | 379/338 |
| 7,075,789 B2 | 7/2006 | Gustine et al. | 361/703 |
| 7,132,605 B2 | 11/2006 | Holmberg et al. | 174/135 |
| 7,190,874 B1 | 3/2007 | Barth et al. | 385/135 |
| 2002/0125800 A1 * | 9/2002 | Knudsen et al. | 312/223.6 |
| 2003/0078015 A1 | 4/2003 | Laetsch | 455/90 |
| 2006/0193590 A1 | 8/2006 | Puetz et al. | 385/135 |
| 2006/0273081 A1 * | 12/2006 | Fernandez et al. | 220/3.2 |
| 2007/0047894 A1 | 3/2007 | Holmberg et al. | 385/135 |
| 2008/0131132 A1 * | 6/2008 | Solheid et al. | 398/117 |

* cited by examiner

*Primary Examiner*—Tuan D Nguyen
(74) *Attorney, Agent, or Firm*—Allen, Dyer, Doppelt, Milbrath & Gilchrist, P.A.

(57) ABSTRACT

A modular housing for outside plant telecommunication equipment includes a main enclosure for containing common electronic equipment and an auxiliary enclosure for containing input/output (I/O) circuitry to said common electronic equipment. In this way, different configurations of I/O circuitry can be accommodated only by changing the auxiliary enclosure. The design and fabrication times for making housings is reduced by the smaller size of each enclosure. Upgrades can often be accommodated by only changing one of the main or auxiliary housings.

11 Claims, 5 Drawing Sheets

US 7,734,040 B1

MODULAR HOUSING SYSTEM FOR OUTSIDE PLANT TELECOMMUNICATIONS EQUIPMENT

BACKGROUND OF THE INVENTION

1. Field of the Invention

The invention relates to the field of remote enclosures for electrical equipment and, more particularly to improved housings for outside plant (OSP) telecommunications equipment.

2. Description of the Prior Art

Conventional housings for outside plant telecommunication equipment, such as the ADTRAN TA1148 OSP housing, are typically designed for a specific product and generally are product limited. When a service provider, such as a telecommunications company, requires significant changes to an OSP product or a manufacturer introduces a new product, it is often necessary to provide a new OSP housing. When the new housing requires geometric changes (e.g. size, PCB component changes, material thickness, etc.) such changes usually add cost and undesirable manufacturing delay. Hence, a new housing, if required, has undesirable consequences. As a result, there is a need for an improved housing that is readily available to meet new specifications and that reduces cost and delays.

PROBLEMS OF THE PRIOR ART

Conventional OSP housings are subject to a variety of problems. For example, conventional OSP housings lack the ability to adapt to a variety of implementation requirements.

Further, such conventional housings require that separate housings be stored in inventory to address the needs of various products, manufacturers and applications. A reduction in parts inventory would be highly desirable. Further, conventional OSP housings are relatively expensive to produce, often because they require a very large casting. Further, existing OSP housings generally lack the ability to adapt to new requirements quickly. Lead times for a re-design of an OSP housing to accommodate new requirements can be significant.

SUMMARY OF THE INVENTION

The problems of the prior art are overcome or at least mitigated through the use of a modular OSP housing system as more particularly described hereinafter. A modular OSP housing system ("housing system") disclosed herein addresses various problems associated with conventional OSP housings. The problems addressed include having a housing system that is adaptive to meet a variety of implementation requirements. When considering existing and future products the adaptability of the disclosed housing system results in a reduction in the number of housing components (solving a parts proliferation problem). For the new housing system (when compared to conventional housings) there is an improvement in reliability and a reduction in housing development costs.

The housing system of the disclosure has a modular design and is adaptable to meet the requirements of a variety of products. The new OSP housing system is comprised of a main body such as a main casting and one or more auxiliary bodies or sub-castings. Hence, the housing system may be viewed as blocks that are coupled in different combinations to meet a specific product requirement. Since modules are reusable, manufacturing cost is often spread over several products thereby reducing the cost of a specific product. In addition, further cost reduction is often provided as production volumes increase. Another benefit of the modular design of the housing system is the ability to form a new housing quickly. Since each component module is smaller the tooling is less complex and it is generally quicker to update or modify modules.

The invention is directed to an enclosure for outside plant electronic equipment, which has a main body for enclosing electronic circuitry and having a plurality of openings. A main body cover covers the main opening in the main body. An auxiliary body can be attached to the main body for enclosing additional electronic circuitry such as input/output circuitry. An auxiliary body cover covers the main opening in the auxiliary body. At least one opening in the main body aligns with an opening in the auxiliary body to permit connection of electronic circuitry in the auxiliary body to electronic circuitry in the main body, such as by using a connector. The enclosure is preferably weather resistant.

The invention is also directed to a method for configuring outside plant telecommunication equipment, by providing a main housing containing common electronic equipment; a plurality of auxiliary housings of different configurations with each auxiliary housing containing a different electrical interface to said common electronic equipment; and by attaching a selected one of said plurality of auxiliary housings to said main housing.

The invention is also directed to a method for providing outside plant telecommunication equipment by storing a plurality of main housings and a plurality of types of auxiliary housings each of which is configured to mount to the main housings. Each type of auxiliary housing may have a different configuration. Manufacturing personnel can attach the appropriate auxiliary housing for a particular application to a main housing. Wiring from the circuitry in the auxiliary housing can be attached to electronic circuitry in the main housing a connector.

BRIEF DESCRIPTION OF THE DRAWINGS

The invention described herein will be more clearly understood from the following description in conjunction with the drawings, wherein.

DETAILED DESCRIPTION OF THE INVENTION

Figure 1:
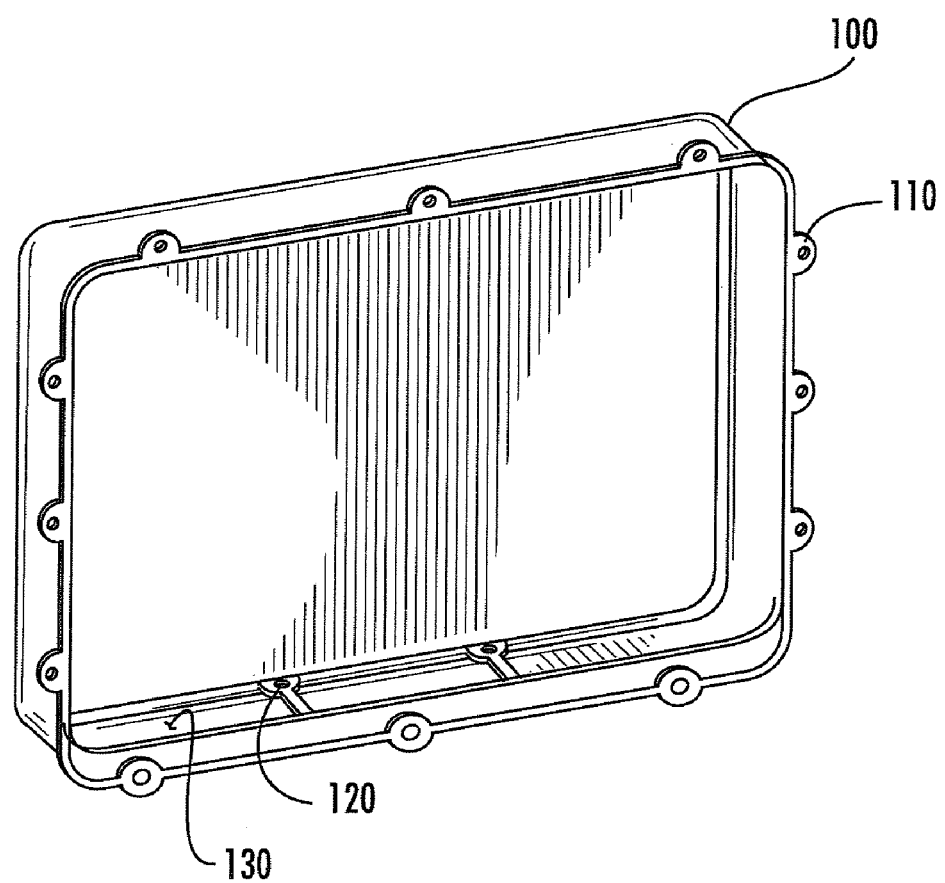
FIG. 1 is a perspective view of a main casting for an OSP housing in accordance with one aspect of the invention.

FIG. 1 shows a front perspective view of a main casting (main body) of an OSP housing in accordance with one aspect of the invention. The housing 100, has the plurality of mounting tabs 110 which are used to secure a cover for the main casting when installed. There are also a plurality of mounting holes 120 which facilitate attachment of a sub-casting to the main casting. Three apertures 130, in this example, enable connections to be made between electronics contained in the sub-casting module to electronic equipment contained in the main casting module 100.

Figure 2:
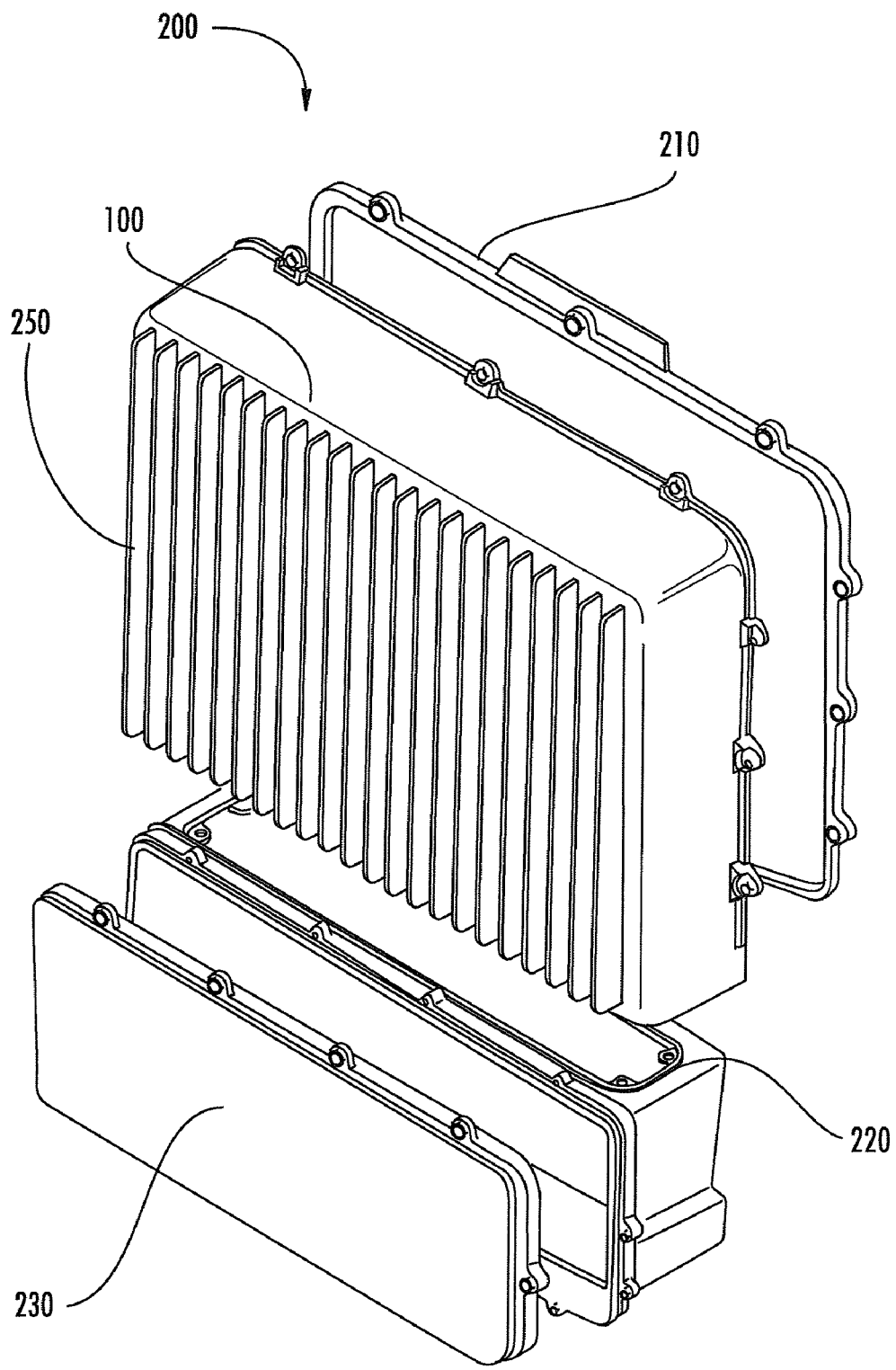
FIG. 2 is an exploded view of a main casting, cover for the main casting, a sub-casting which attaches to the main casting and a cover for the sub-casting, in accordance with one aspect of the invention.

Turning to FIG. 2, the housing system 200 is comprised of 4 components. The components are:
- a main casting 100 for holding Printed Circuit Boards (PCBs) and related electronics.
- a main casting cover 210 for sealing an aperture of the main casting.
- subcasting 220 (for holding I/O modules), and
- subcasting cover 230 for sealing an aperture of the sub-housing.

The main casting 200 has a cavity enclosed by the main casting 100 and the main casting cover 210 for containing and protecting the printed circuit boards of an OSP DSL system, such as an ADTRAN TA1148. The sub-casting 220 has a cavity for containing and protecting specific Input/Output devices that connect electronics, such as a DSL system, to the outside world, i.e., telecommunication cables. There are apertures between the main casting 100 and the sub-casting 220 permitting connection of electronics mounted in the main casting with Input/Output electronics contained in the sub-casting. When the main casting 100 is coupled to the sub-casting 220 a gasket placed in e.g. a gasket groove and provides a protective seal.

The main casting 100 is not product specific and can contain one or more PCBs for a variety of different products. In prior art housing designs, an entire assembly was built as one unit that was product specific and contained both PCBs and I/O modules. In the prior art housings, it was usually not feasible to have multiple products contained in one casting because the I/O requirements were usually significantly different. For the new housing a separate I/O, sub-casting 220 allows for different configurations to use the same main casting.

Figure 3:
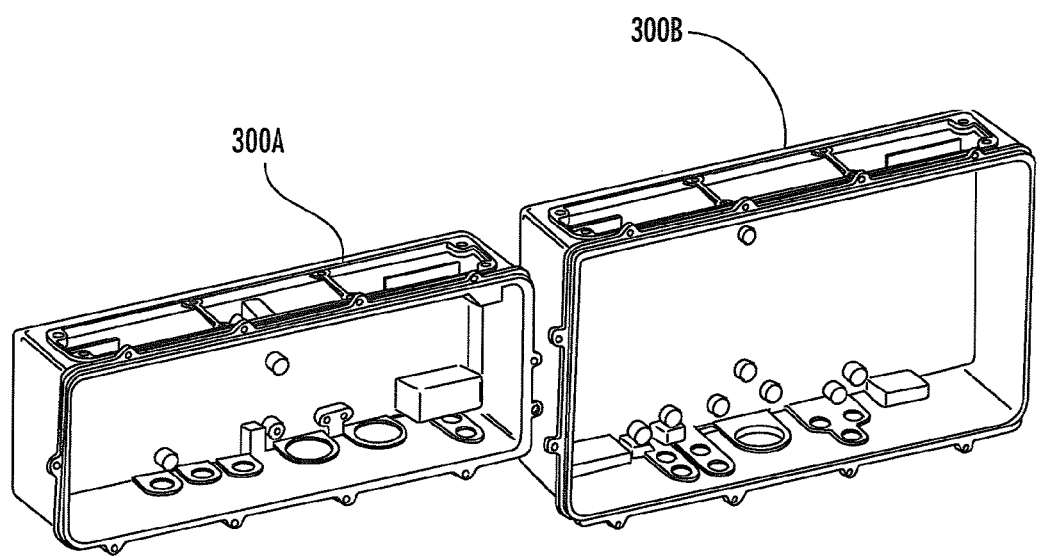
FIG. 3 is a perspective view of two different sub-castings, side-by-side, both of which can mount to a main casting in accordance with one aspect of the invention.

There can be different geometries for sub-casting 220 depending on product features or customer requirements. The same PCB housing and electronics can be used with different I/O assemblies associated with the requirements. Two possible sub-castings 300A, 300B are depicted in FIG. 3. Either of these sub-castings attach to the main casting 200 allowing the housing system 100 to adapt to different requirements.

One significant benefit of the modular approach is that parts are re-usable. In the past it was often not practical to develop different castings for different products. Hence there was often design compromises that required specification changes and/or unnecessary cost. However, some perceived needs were just too expensive. Some large housing sizes burdened an entire product line with unnecessary expense. In some cases products were not available for some potential markets.

The housing system of the disclosure provides for multiple custom housing structures. A manufacturer can have the same electronics connecting with different customer specific protection if necessary. (For instance, one product may require the ADC/switching block with protection and another product use the standard protector block with 5 pin protector modules).

FIG. 2 shows an exploded view of a main casting, cover for the main casting, a sub-casting which attaches to the main casting and a cover for the sub-casting in accordance with one aspect of the invention. In this view, the main casting 100 shows the heat dissipating fins 250 which were not visible in the FIG. 1 view of the main casting. This view shows the main casting cover 210 and its relationship to mounting on the main casting. A sub-casting 220 mounts to the main casting, as discussed both above and hereinafter. Sub-casting 220 also has a separate cover 230 which attaches to the sub-casting. Each of the main casting cover 210 and sub-casting cover 230 may utilize a mounting gasket or O-ring type seal for insuring a weather tight connection between the covers and the castings to which they are attached. Similarly, a gasket or O-ring might help seal the connection between the sub-casting and the main casting to prevent ingress of the elements from the environment.

In usage, the sub-casting can be utilized to contain the Input/Output circuitry for the communications equipment within the housing. These requirements tend to be the most frequently changed.

FIG. 3 shows a perspective view of two different sub-castings side-by-side, in accordance with one aspect of the invention. Each of these sub-castings is configured to mount to the same main casting. Note the difference in sizes between the two sub-castings. The one on the left is considerably smaller than the one on the right. The requirements of different customers may require different sized sub-castings. Sometimes, the requirements of a particular customer change requiring different physical specifications for the sub-casting. In the past, OSP housings would be manufactured as a single, very large casting. Any change in the specification for such a large housing would face redesign and delivery times in the 10-15 week range. The large size of the prior art unitary castings would require expensive equipment of a specialized nature to accommodate the size. By separating one large casting into the modular components in accordance with the invention, the redesign and delivery times for revised castings are considerably reduced. In addition, since most of the changes to the OSP housing reside in the Input/Output portion of the circuitry, which resides in the sub-casting, the sub-casting can be changed independently of the entire overall casting. Further, smaller castings associated with the sub-casting can be revised and manufactured in a much shorter time frame then could be achieved with a unitary casting.

Figure 4:
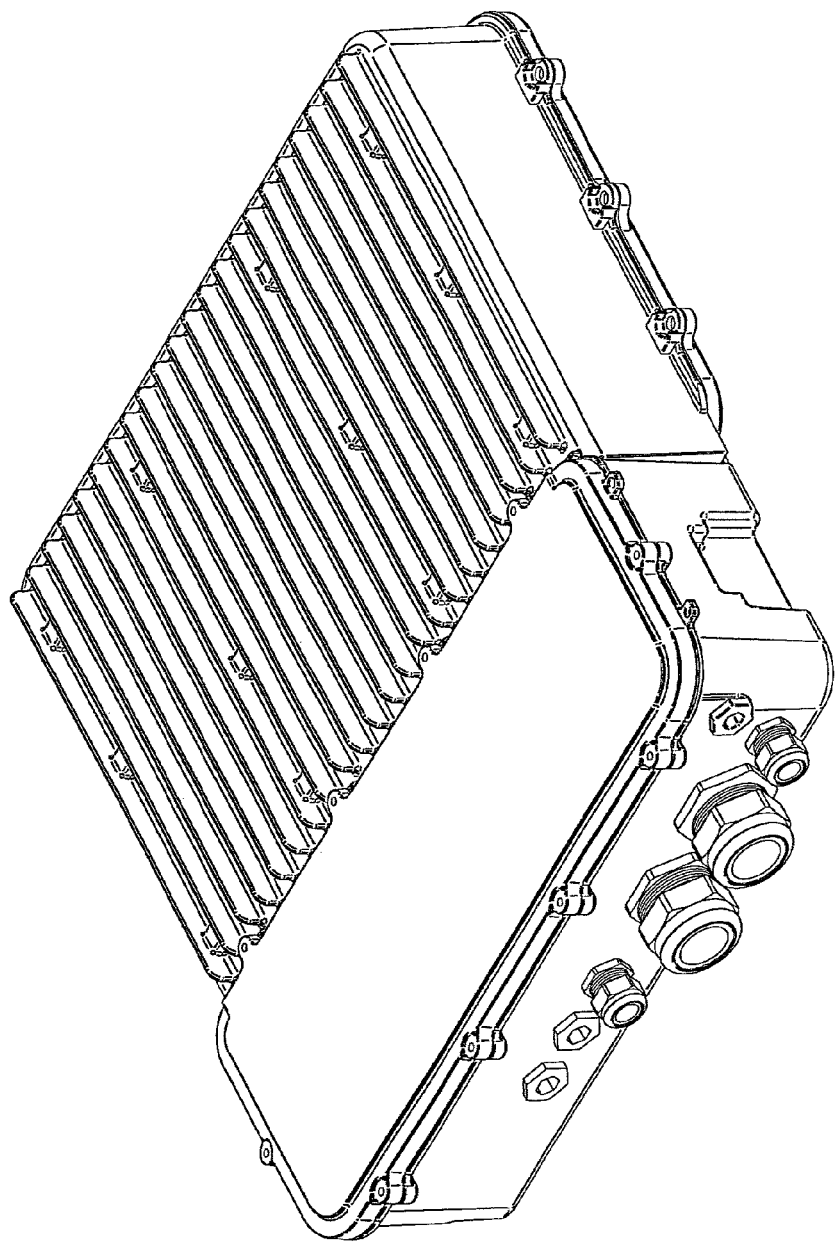
FIG. 4 shows a perspective view of a sub-casting attached to a main casing.

FIG. 4 is a perspective view of a sub-casting attached to a main casting in accordance with one aspect of the invention.

Figure 5:
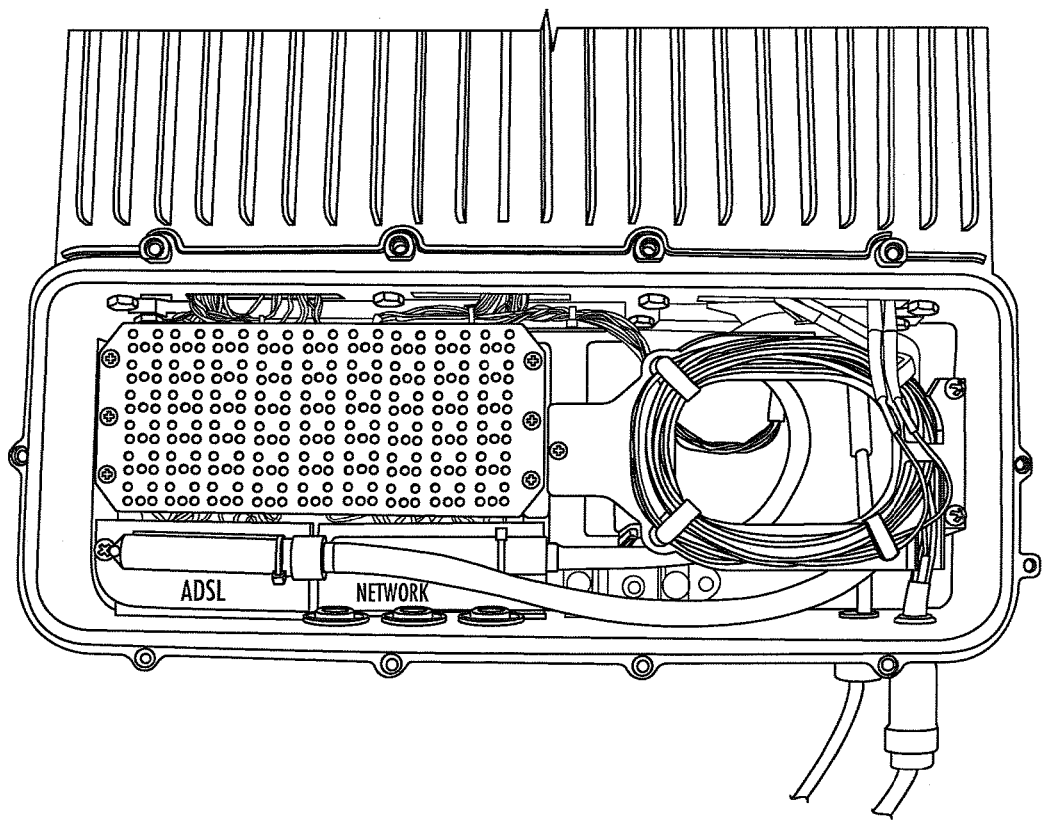
FIG. 5 is a view of the sub-casting with the sub-casting cover removed showing exemplary Input/Output circuitry and cables and showing attachment of the sub-casting to the main casting.

FIG. 5 is a view of the sub-casting with the sub-casting cover removed showing exemplary Input/Output circuitry and cables and showing attachment of the sub-casting to the main casting. As shown in FIG. 5, there are four bolt heads visible which pass through mounting apertures 120 shown in FIG. 1 of the main casting. Thus, the sub-casting is bolted to the main casting and held in place.

While various embodiments of the present invention have been illustrated herein in detail, it should be apparent that modifications and adaptations to those embodiments may occur to those skilled in the art without departing from the scope of the present invention as set forth in the following claims.

What is claimed:

1. An enclosure for outside plant electronic equipment, comprising:
   a. a main body for enclosing electronic circuitry and having a plurality of openings;
   b. a main body cover for attachment to the main body for covering a first opening;
   c. an auxiliary body for attachment to the main body for enclosing additional electronic circuitry and having a plurality of openings;
   d. an auxiliary body cover for attachment to the auxiliary body for covering a first opening in the auxiliary body;
   e. in which at least one opening in the main body aligns with an opening in the auxiliary body to permit connection of electronic circuitry in the auxiliary body to electronic circuitry in the main body, wherein the additional circuitry includes input/output circuitry comprising xDSL input/output circuitry.

2. The enclosure of claim 1 in which the enclosure is weather resistant.

3. The enclosure of claim 1 in which the attachment of the main body cover to the main body is rendered weather resistant using a gasket or an O-ring.

4. The enclosure of claim 1 in which the attachment of the auxiliary body cover to the auxiliary body is rendered weather resistant using a gasket or an O-ring.

5. The enclosure of claim 1 in which the input/output circuitry comprises network input/output circuitry.

6. The enclosure of claim 1 in which the electronic circuitry enclosed in the main body includes telecommunications equipment.

7. The enclosure of claim 1 in which electronic circuitry in the auxiliary body is connected to the electronic circuitry in the main body using a removable connector.

8. The enclosure of claim 1 in which at least one surface of the main body or the auxiliary body is provided with heat sink fins for heat dissipation.

9. The enclosure of claim 1 in which the main body attaches to auxiliary bodies of different configurations.

10. A method for configuring outside plant telecommunication equipment, comprising the steps of:
   providing a main body for enclosing electronic circuitry and having a plurality of openings;
   providing a main body cover for attachment to the main body for covering a first opening;
   attaching an auxiliary body to the main body for enclosing additional electronic circuitry and having a plurality of openings;
   attaching an auxiliary body cover to the auxiliary body for covering a first opening in the auxiliary body; and
   wherein at least one opening in the main body aligns with an opening in the auxiliary body and connecting electronic circuitry in the auxiliary body to electronic circuitry in the main body, wherein the additional circuitry includes input/output circuitry comprising xDSL input/output circuitry.

11. The method of claim 10, further comprising connecting an electrical interface of said selected one of said plurality of auxiliary housings to said common electronic equipment.

* * * * *